US005137005A

United States Patent [19]

Kirby

[11] Patent Number: 5,137,005

[45] Date of Patent: Aug. 11, 1992

[54] ROTARY FUEL DISTRIBUTOR SYSTEM FOR AN INTERNAL COMBUSTION ENGINE

[76] Inventor: Ronald A. Kirby, 97 Miller La., Ft. Thomas, Ky. 41075

[21] Appl. No.: 489,412

[22] Filed: Mar. 6, 1990

[51] Int. Cl.[5] ....................... F02M 29/00; B01D 45/12

[52] U.S. Cl. ....................................... 123/592; 55/455; 261/78.1

[58] Field of Search .................. 123/590, 592; 55/455, 55/337; 261/84, 89, 78 R, 79 R

[56] References Cited

U.S. PATENT DOCUMENTS

| | | | |
|---|---|---|---|
| 1,237,779 | 8/1917 | Hedrick | 123/592 |
| 2,027,480 | 1/1936 | Higley | 123/592 |
| 2,051,556 | 8/1936 | Higley | 123/592 |
| 2,205,388 | 6/1940 | Boatright | 123/592 |
| 3,544,290 | 12/1970 | Larson | 123/592 |
| 3,945,361 | 3/1976 | Piotrowicz | 123/592 |
| 3,946,717 | 3/1976 | England | 123/592 |
| 3,977,374 | 8/1976 | August . | |
| 4,011,850 | 3/1977 | Knox | 123/592 |
| 4,109,620 | 8/1978 | Webb . | |
| 4,285,320 | 8/1981 | Webster . | |
| 4,308,837 | 1/1982 | Nohira . | |
| 4,465,034 | 8/1984 | Tsutsumi . | |
| 4,465,035 | 8/1984 | Carr . | |
| 4,474,145 | 10/1984 | Boyesen . | |
| 4,592,329 | 6/1986 | Yunick . | |
| 4,729,776 | 3/1988 | Elliff | 123/592 |

*Primary Examiner*—Carl Stuart Miller

*Attorney, Agent, or Firm*—Frost & Jacobs

[57] ABSTRACT

A rotatable element is disposed in the central plenum of a minifold which rotates in response to the flow of the air-fuel mixture through the plenum and manifold. The rotation of the element enhances the atomization of entrained liquid fuel droplets in the flow and redirects the flow uniformly to all port runners. The rotatable element may include vanes for causing its rotation.

18 Claims, 7 Drawing Sheets

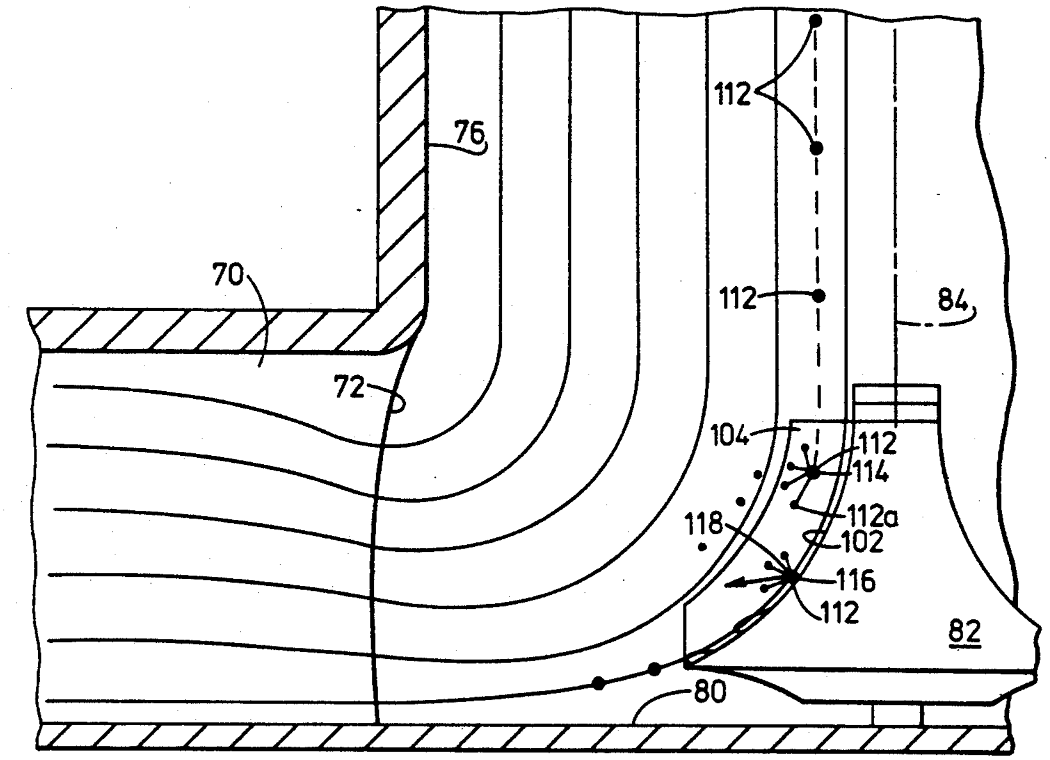
FIG. 9
FIG. 13A
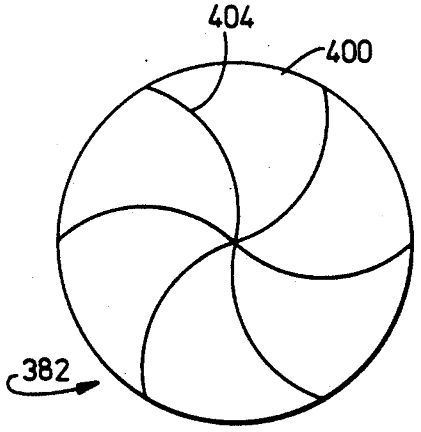
FIG. 13B
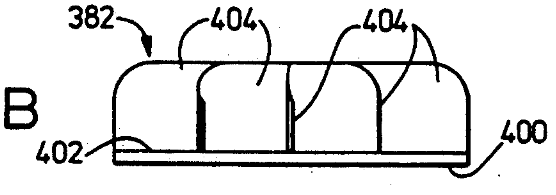

ROTARY FUEL DISTRIBUTOR SYSTEM FOR AN INTERNAL COMBUSTION ENGINE

TECHNICAL FIELD

The present invention relates generally to an air and fuel distributor for use with multi-cylinder internal combustion engine, and is particularly directed to a rotating distributor which improves the vaporization and the uniform distribution of liquid fuel. The invention will be specifically disclosed in connection with a rotatable element which is disposed in the flow of the air-fuel mixture, and driven by the air-fuel flow so as to direct the air and fuel uniformly toward the cylinders.

BACKGROUND OF THE INVENTION

A typical engine fuel delivery system, including a carburetor, introduces fuel into an established flow of air created by the reciprocating action of the cylinders and synchronized valve train. With a carburetor, for example, as the liquid fuel is drawn into the air flow by the venturi design of the carburetor throat and fuel nozzle, some of the liquid fuel is immediately vaporized, while the remainder is atomized. It is the atomized fuel which produces the cloudy appearance of the air-fuel mixture downstream of the carburetor. The atomized fuel exists as liquid droplets of varying sizes suspended in the air flow. The efficiency of a particular fuel delivery system in converting liquid fuel to gaseous fuel depends upon its particular design. Ideally, any atomized fuel exists as very small sized liquid droplets, and vaporizes prior to entering the cylinder. One method utilized by the prior art to maximize the vaporization and minimize the droplet size of liquid fuel in the carburetor is the use of an injector nozzle through which some pressurized fuel is vaporized, and the remainder of the of the pressurized fuel is atomized into a relatively fine mist.

In typical naturally asperated multi-cylinder internal combustion engines, such as those used in the automotive industry, a substantially continuous flow of an air-fuel mixture is produced by a carburetor and delivered in successive charges to individual cylinders to be combusted therein. The air-fuel mixture travels through passageways formed in the intake manifold, which is adapted for receiving the air-fuel mixture from the carburetor and for delivering the air-fuel mixture to the intake port of the respective cylinders formed in the engine block. One particular arrangement of the passageways within the intake manifold includes an open or central plenum which has a plurality of individual port runners leading therefrom to respective cylinders and associated intake valves. The air-fuel mixture is drawn through the central plenum, through the port runner and into the cylinder. The port runners originate at the bottom of the central plenum and are oriented generally perpendicular to the direction of flow of the air-fuel mixture through the central plenum, so that the flow must turn about 90° as it passes from the central plenum to the port runners.

The combustion of the air-fuel mixture within a given cylinder is dependent upon many factors. Two of the most important factors are the amount of fuel present in the cylinder and the phase state in which it exists. The most efficient combustion of the air-fuel mixture occurs when the fuel is present as vapor rather than as atomized liquid droplets suspended in the air. Preferably, all of the fuel in the air-fuel mixture has been vaporized prior to the initiation of combustion in the cylinder.

The presence of liquid fuel droplets in the combustion chamber reduces the power output and fuel efficiency of the engine. Liquid fuel in the combustion reduces the heat of combustion, thereby limiting the power output of the engine. Much of the fuel which is present as liquid does not combust and is exhausted unburnt from the cylinder without producing power. If fuel droplets are present in the air-fuel mixture at the time of combustion, the negative effects on combustion are minimized if the droplet size is minimized (i.e. atomization is maximized).

Engines are usually designed to operate on a uniform distribution of the air-fuel mixture to each cylinder so that each cylinder produces about the same amount of power as a result of combustion. Thus, the power output of an engine is maximized when the fuel delivery system delivers equal amounts of fuel and equal amounts of air to each cylinder under all operating conditions. However, due to physical layout and other design compromises, many engines suffer from a firing order imbalance which produces an unequal distribution of air and fuel from cylinder to cylinder. This unequal distribution of air and fuel produces a variation in the air-fuel ratio between the cylinders which is manifested as unequal amounts of liquid fuel droplets and the unequal distribution of the various sized droplets. The unequal air-fuel ratio results in some cylinders running too lean, while other cylinders run too rich. Such conditions may be determined by measuring the temperature of the exhaust gasses from each cylinder. The leaner that a cylinder operates, the higher the temperature of combustion and of the exhaust gases. Thus, in an engine with a firing order imbalance, the temperatures of the exhaust gases of the cylinders will not be equal to each other, with the leanest cylinder having the highest temperature. The exhaust gas temperatures of a typical engine with a firing order imbalance may vary by 150° or more between cylinders.

In an ideal engine in which all of the fuel has been vaporized prior to reaching the port runners, a firing order imbalance would not produce such variations in the air-fuel ratio, since the air and gaseous fuel would remain relatively homogenous and flow along streamlines, independent of the operation of the engine.

Despite the objective of maximizing vaporization of the fuel at the point at which it is admixed with the air flow in the carburetor, the air-fuel mixture exiting the carburetor typically includes vaporized fuel and entrained liquid fuel droplets. These fuel droplets have masses significantly greater than the mass of the gaseous fuel molecules. The suspended liquid droplets tend to fall out of suspension from the air-fuel mixture as it travels from the carburetor to the cylinders, due at least in part to the changes in direction of the flow along the air-fuel passageway. The fuel which falls out of suspension may flow into the cylinder along the bottom of the port runners. The fuel which is present in the air-fuel mixture as vapor does not fall out of suspension.

FIGS. 1 and 2 illustrate the liquid fuel droplets falling out of suspension. FIG. 1 shows a typical prior art carburetor 10 which includes valve 12 located in passageway 14 upstream of fuel orifice 16. As previously mentioned, fuel orifice 16 may comprise a venturi jet through which liquid fuel is drawn into the air stream through passageway 14, by venturi action, or may comprise a fuel injector which atomizes and vaporizes fuel that is forced under pressure therethrough.

Valve 12 is rotated to control the flow of air through passageway 14, which concomitantly controls the flow of fuel from orifice 16. Carburetor 10 is secured to flange 18 of intake manifold 20 adjacent inlet 22, with gasket 24 interposed therebetween. Manifold 20 includes open or central plenum 26 which communicates about its lower periphery 28 with a plurality of port runners 30, as will be discussed below. Each port runner 30 communicates with a respective cylinder inlet formed in the engine block (not shown) and cylinder. Central plenum 26 communicates with port runners 30 through port opening runner 32. Thus, an air fuel passageway is formed from inlet 22, through central plenum 26 and through the respective port runner 30. This open plenum manifold 20 receives the flow of the air-fuel mixture from carburetor 10 and delivers the flow to each respective cylinder.

FIG. 2 is a schematic representation of the multitude of streamlines 34 of the flow through central plenum 26 as the flow is bent or directed at lower periphery 28 into a respective port runner 30. As is shown, streamlines 34 tend to compress, or get closer together near bottom 36 of plenum 26 as they negotiate the turn adjacent thereto, and eventually expand downstream of port runner openings 32 as shown generally at 38. Fuel in the air-fuel mixture which exists as vapor is present in the form of molecules. The low mass of the individual fuel molecules allow the vaporized fuel to flow essentially along streamlines 34, remaining in the flow as it negotiates the turn at bottom 36 of central plenum 26. The fuel vapor molecules are generally intermixed well with the air molecules, and are generally uniformly distributed throughout the air-fuel mixture flow. The air-vaporized fuel mixture is not subject to the problems of firing order imbalance, since the low mass of the air and fuel molecules allow them to respond quickly to changes in the flow as the sequential opening and closing of the intake valves occur. Schematically depicted liquid droplets 40, 42 and 44 are less likely to negotiate the change in direction of the air-fuel mixture flow as illustrated in FIG. 2, and tend to fall out of suspension due, it is believed, to their inability to travel along the curved streamlines 34, because of the droplets' inertia. The largest liquid droplets, illustrated as 40, tend to be relatively unaffected by the curved streamlines 34, particularly in the central region 46 of central plenum 26, where the streamlines tend to stagnate or disperse due to turbulence. As illustrated in FIG. 2, droplets 40 tend to travel relatively straight downwardly and impact bottom 36 at 48. Upon impact, large droplets 40 will "splatter", yielding some vaporized fuel due to the mechanics and energy of the impact, and yielding smaller liquid droplets, generally illustrated as **40*a*. The vaporized fuel will mix with the air-fuel mixture flow. The smaller atomized remnant droplets 40*a* of large liquid droplets 40 may either become entrained in the air-fuel flow, or impact bottom 36 of central plenum 26** and remain thereon.

Liquid droplets 42 are illustrated as being smaller than liquid droplets 40, and are affected to a greater degree by curved streamlines 34. These intermediate sized droplets 42 are illustrated as impacting bottom 36 at 50, producing some vaporized fuel, and some smaller droplets **42*a* due to the mechanics and energy of the impact, similar to that described above with respect to droplets 40**.

Yet smaller droplets 44 are illustrated as being affected even more by curved streamlines 34, but eventually striking bottom 36 at point of impact 52, yielding vaporized fuel and yet smaller liquid droplets **44*a*** in accordance with the description above.

Although large droplets 40 are illustrated in the central region 46, and small droplets 44 near the wall of central plenum 26, it will be understood that the droplet size is not necessarily a function of the droplet location. Small droplets will occur in the central region 46, while large droplets will occur near the wall. Small droplets in the central region 46 will tend to follow the streamlines 34, while large droplets 40 near the wall will tend to impact bottom 36.

Whether a particular liquid fuel droplet remains entrained in the air flow as it negotiates turns in the air-fuel passageway, particularly at the bottom of the central plenum, depends upon several factors. Some of these factors are droplet size, the flow rate and speed of the air-fuel mixture and the location of the fuel droplet relative to the center of the central plenum. For example, very small fuel droplets flowing downwardly through the central region of the central plenum may remain entrained in the air-fuel flow, while medium size droplets flowing near the outer periphery of the central plenum may fall out of suspension. Also, it is believed that as liquid droplets cross steamlines, there is a tendency for them to break up into smaller droplets, with some of the resulting droplets being redirected by the flow and remaining entrained in the air-fuel flow. Additionally, the amount of turbulence created varies with the physical parameters of the central plenum, firing order, and flow velocity, and can affect the degree of atomization and degree of vaporization of the liquid droplets. Transient conditions which result from changes in the flow rate, which may be chaotic in nature, can have an impact on the amount of liquid droplets which negotiate the flow path bends.

Liquid droplets which impact bottom 36 may leave some residual liquid fuel thereon. The accumulation of this liquid fuel, if not vaporized or reentrained by the flow adjacent bottom 36, may produce a stream of liquid flowing along the bottoms of port runners 30, and into the cylinders. The presence of this liquid further reduces the total energy of combustion of that particular cylinder.

The tendency of the liquid fuel droplets to fall out of suspension due to directional changes in the air-fuel flow and to cross the flow streamlines contributes to or enhances the affects of the firing order imbalance. FIG. 3 shows a schematic representation of intake manifold 20 with central plenum 26 and eight port runners 30. As can be seen, FIG. 3 shows port runners 30 and associated port runner openings 32 as being uniformly distributed about the lower periphery 28 of central plenum 26. However, as shown in FIG. 4, pairs of port runners 30 may be grouped together, having a common port runner opening **32*a*, or having immediately adjacent respective port runner openings 32 disposed about lower periphery 28 of central plenum 26**. The actual physical location of the port runners, along with their particular length and characteristics, when coupled with a given firing order, tend to set up a flow resonance which favors the flow of the air-fuel mixture towards a particular group of cylinders, i.e., through a particular group of port runners. It is believed that this resonance can impart directional momentum to the entrained fuel droplets toward the "favored" port runners. This results in the non-uniform distribution of fuel between cylinders. While the air and vaporized fuel flowing into and through central plenum 26 is believed to be generally uniformly distributed to the port runners despite the firing order imbalance, there is a significant variation in the air-fuel ratio of the flow to each respective cylinder. It is believed that this results due to the tendency of liquid fuel droplets to come out of suspension, and the affect that the firing order imbalance has on directing these liquid fuel droplets toward the "favored" cylinders. While the air and vaporized fuel molecules have masses low enough to allow them to respond quickly to the changes in direction of flow which occurs in manifold 20 due to the sequential opening and closing of the intake valves, the liquid droplets cannot respond as quickly due to their momentum.

Firing order imbalance, and the flow resonance created thereby, is dependent upon the operating conditions of the engine, such as engine speed, load, ambient conditions, fuel, etc. For example, at a given engine speed, certain cylinders will be "favored", tending to have a richer air-fuel ratio than the other cylinders. Correspondingly, certain other cylinders will have a lean air-fuel ratio. The resultant of the variation in the air-fuel ratio between the cylinders is a variation in the efficiency and the power between the cylinders. Some cylinders have less vaporized fuel and more atomized fuel then others. The droplet sizes and distribution of the various sized droplets varies from cylinder to cylinder, affecting the completeness and efficiency of the combustion in the respective cylinder.

As shown in FIG. 5A, certain cylinders in this example tend to burn hotter than other cylinders at a particular engine speed due to firing order imbalance and the accompanying flow resonance. This indicates the variation in the air-fuel ratio between cylinders. The leaner the mixture, the higher the temperature of combustion and resultant gas temperatures. The richer the mixture, the lower the temperature of combustion and exhaust gas temperatures. FIG. 5A shows certain cylinders having hotter exhaust gasses than other cylinders. FIG. 5B illustrates a shift in the flow resonance due to a change in the engine speed. FIGS. 5*a* and 5B illustrate the differences in firing order imbalance under fixed operating conditions (other than engine speed) occurring at different engine speeds.

The temperature of the exhaust gases is not only reflective of the fuel ratio variation, but also is dependent upon the degree of homogenous mixing of the air and fuel, as well as the quantity and size of liquid fuel droplets entrained in the air-fuel mixture. As is well known in the art, the larger the droplets, the less efficiently the fuel is combusted. This is due to the amount of free oxygen molecules which are able to surround the fuel droplet.

Thus, there is the need in the art to alleviate this problem.

SUMMARY OF THE INVENTION

Accordingly, it is a primary object of the present invention to provide the delivery of an air-fuel mixture to each cylinder which has a substantially uniform air-fuel ratio from cylinder to cylinder, thereby resulting in substantially uniform cylinder combustion temperatures.

It is another object of the present invention to minimize the effects of firing order imbalance on the air-fuel ratio of the flow received by each cylinder.

It is yet another object of the present invention to increase the vaporization of the liquid fuel entrained in the air-fuel flow prior to entering the cylinders. Yet another object of the present invention is to reduce the amount of entrained liquid fuel droplets which fall out of suspension from the air-fuel flow.

A still further object of the present invention is to increase the atomization and vaporization of liquid fuel droplets entrained in the air-fuel mixture flowing through the port runners.

Another object of the present invention is to equalize the power output of each cylinder within a range by substantially equalizing the air-fuel ratio of the charges delivered to each cylinder.

Yet another object of the present invention is to increase the overall engine power by equalizing the air-fuel ratio of each cylinder.

Another object of the present invention is to provide a manifold which delivers flows of an air-fuel mixture having equal air-fuel ratios to each cylinder.

Still another object of the present invention is to achieve the aforementioned objects economically, without undue complexity, and in a manner which allows retrofitting of existing engines or the incorporation of the invention in the original design and manufacture of the engine.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an air-fuel mixture distributor for use in an air-fuel passageway is provided which comprises a rotatable element that is adapted to be rotatably disposed at least partially in the air-fuel passageway. The rotatable element includes means for causing the element to rotate in response to the air-fuel mixture flow through the passageway.

In accordance to a further aspect of the invention, the rotation of the rotatable element is caused only by the flow of the air-fuel mixture.

According to a further aspect of the invention, the rotatable element is disposed so that the air-fuel flow impinges the rotatable element in a direction which is generally parallel to the axis of rotation of the rotatable element.

In yet another aspect of the present invention, the rotatable element includes means for directing the air-fuel flow in a direction which is substantially radially outward from the axis of rotation.

In a still further aspect of the invention, the radially outwardly directed flow is substantially perpendicular to the axis of rotation.

In accordance to yet another aspect of the present invention, the rotatable element includes means for distributing fuel which is entrained in the air-fuel flow in an outward direction from the axis of rotation.

According to a still further aspect of the invention, means are provided for directing the air-fuel flow to impinge the rotatable element. The air-fuel flow may impinge the rotatable element generally parallel to its axis of rotation.

In a still further aspect of the invention, an intake manifold for use with internal combustion engines is provided which includes an air-fuel passageway formed therein with at least one inlet and one outlet. The passageway is adapted to received the air-fuel flow through at least one of the inlets and to direct the flow therethrough and out at least one of the outlets. A rotatable element is rotatably disposed at least partially in the passageway.

According to another aspect of the present invention, the passageway includes a central plenum in fluid communication with the inlets and the outlets, and the rotatable element is disposed in the central plenum.

In yet another aspect of the invention, the axis of rotation of the rotatable element is substantially parallel to the general direction of the air-fuel flow through the central plenum.

In accordance with another aspect of the invention, the central plenum is disposed immediately adjacent to at least one of the inlets, with the central axis of the central plenum being parallel to the general direction of the air-fuel flow therethrough and to the axis of rotation.

According to another aspect of the invention, the passageway includes at least one port runner between the central plenum and a respective outlet, each port runner being in fluid communication therewith.

In yet a further aspect of the invention, the central plenum is configured to direct the air-fuel flow generally parallel to the axis of rotation of the rotatable element.

According to a further aspect of the invention, a portion of the central plenum is shaped complimentary to the rotatable element.

In a still further aspect of the invention, an annular orifice is formed in the passageway between the inner peripheral surface of the central plenum and the rotatable element.

In accordance to yet another aspect of the invention, the axial position of the rotatable element along its axis of rotation may be varied.

According to a still further aspect of the invention, the inner peripheral surface of the central plenum is shaped complimentarily to the rotatable element so that the cross-sectional area of the annular orifice varies concommittantly with the axial position of the rotatable element.

In yet another aspect of the invention, at least one port runner is disposed between the central plenum and a respective outlet, communicating with the central plenum through a respective port runner opening.

In a still further aspect of the invention, an internal combustion engine is provided which includes a rotatable element disposed in a passageway for directing an air-fuel flow from the air-fuel mixing means to the cylinders. The rotatable element includes means associated therewith for causing the rotatable element to rotate in response to the air-fuel flow through the passageway.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspets all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 9 is an enlarged diagrammatic cross-sectional view of the central plenum of port runners having a rotatable element therein.

FIG. 13A is a diagrammatic top view of an alternate embodiment of the rotatable element of the present invention.

FIG. 13B is a diagrammatic side view of the rotatable element of FIG. 13A.

Reference will now be made in detail to the present preferred embodiment of the invention, an example of which is illustrated in the accompanying drawings.

DETAILED DESCRIPTION OF THE PREFERRED EMBODIMENT

Figure 1:
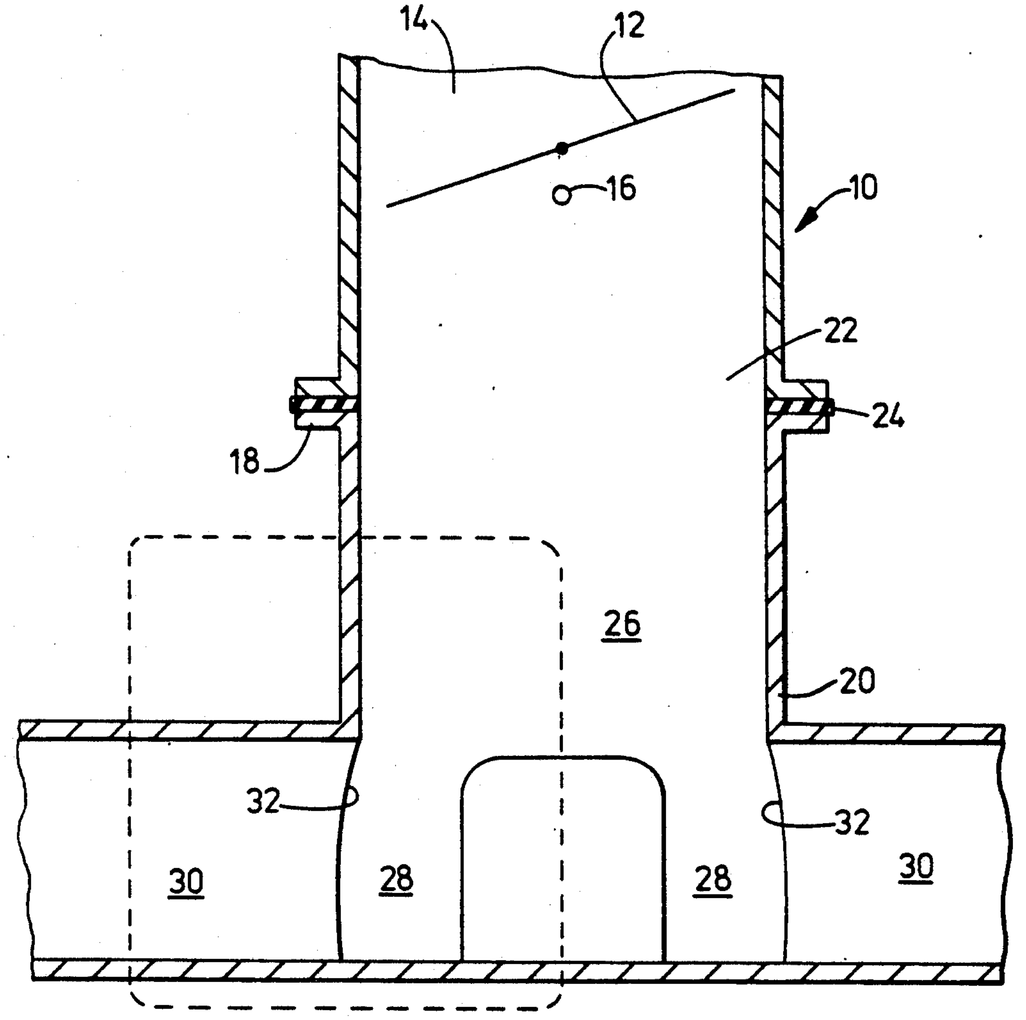
FIG. 1 is a diagrammatic side cross-sectional view of a prior art open plenum manifold and carburetor.
Figure 3:
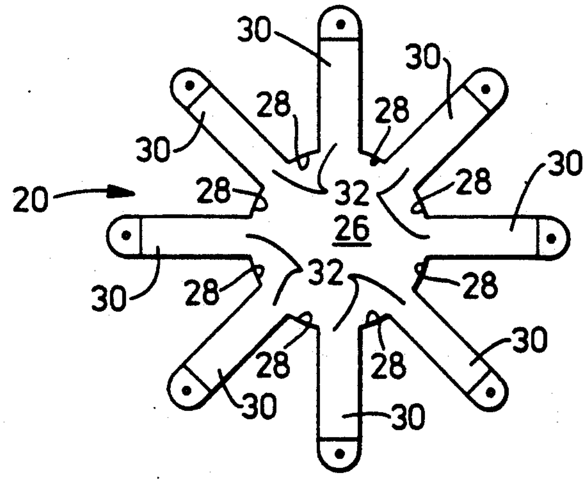
FIG. 3 is a diagrammatic representation of the intake manifold and associated port runners.
Figure 2:
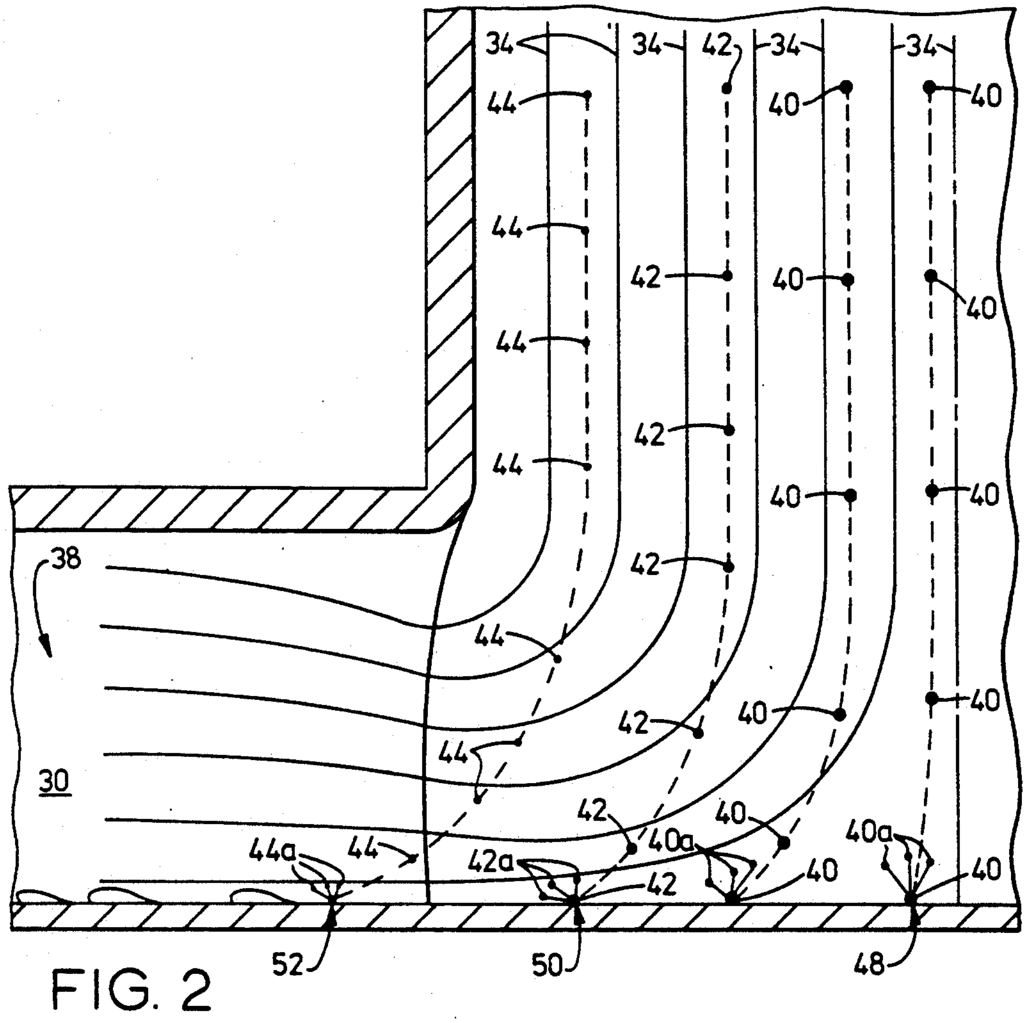
FIG. 2 is an enlarged diagrammatic cross-section of the central plenum and port runners of FIG. 1, illustrating streamlines of the air-vaporized fuel mixture flow and paths of the liquid fuel droplets entrained in that flow.
Figure 6:
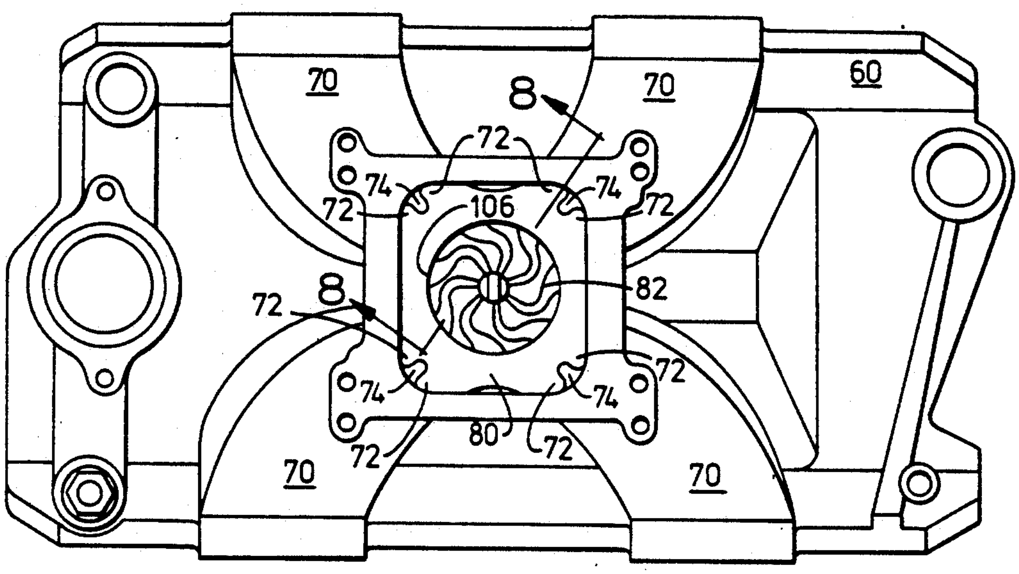
FIG. 6 is a top view of an intake manifold incorporating the present invention.
Figure 7:
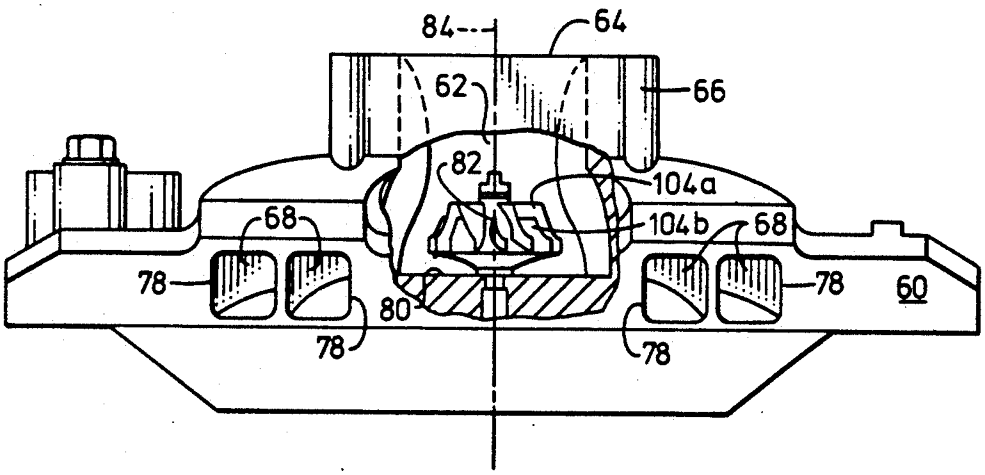
FIG. 7 is a side view in partial cross-section of the intake manifold of FIG. 6.

Referring now to the drawings in detail, wherein like numerals indicate the same elements throughout the views, FIGS. 6 and 7 show intake manifold 60 configured in accordance with the present invention. Intake manifold 60 includes open or central plenum 62 which communicates with inlet 64 located at the top of central plenum 62. Flange 66 is formed immediately adjacent inlet 64, and configured to receive a carburetor (not shown) similar to carburetor 10 of FIG. 1.

Figure 4:
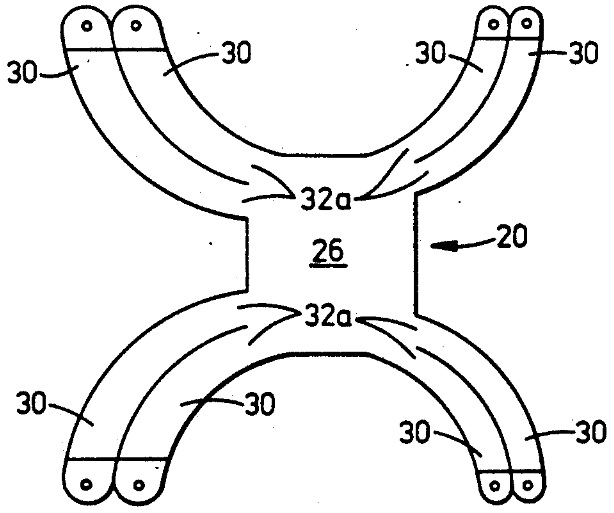
FIG. 4 is a diagrammatic representation of the intake manifold and port runners, showing a particular physical disposition of pairs of port runners.

Intake manifold 60 includes eight port runners 68 formed as passageways through port runner housings 70. Port runners 68 are grouped in pairs, and open adjacent each other into central plenum 62, as more clearly depicted in FIG. 4. The location of port runner openings 72 is illustrated in FIG. 6 by the numeral 72, although each actual opening is not depicted in this view. Ribs 74 are formed as part of internal peripheral surface 76, providing internal aerodynamic contouring in central plenum 62 to direct the flow of the air-fuel mixture through plenum 62. Ribs 74 are disposed between adjacent port runner openings 72. Each port runner 68 terminates in a respective port runner outlet 78. When manifold 60 is connected to an engine (not shown), port runner outlets 78 align with respective cylinder inlets (not shown), thereby placing each port runner 68 in fluid communication with a respective cylinder inlet (not shown) and associated cylinder (not shown). Thusly, flow paths for the air-fuel mixture are established through central plenum 62, port runner opening 72, respective port runners 68 and into respective cylinders. As is clearly illustrated, central plenum 62 includes inlet 64 which is adapted to receive a flow of an air-fuel mixture, and direct the flow toward a cylinder of a multi-cylinder engine.

Figure 8:
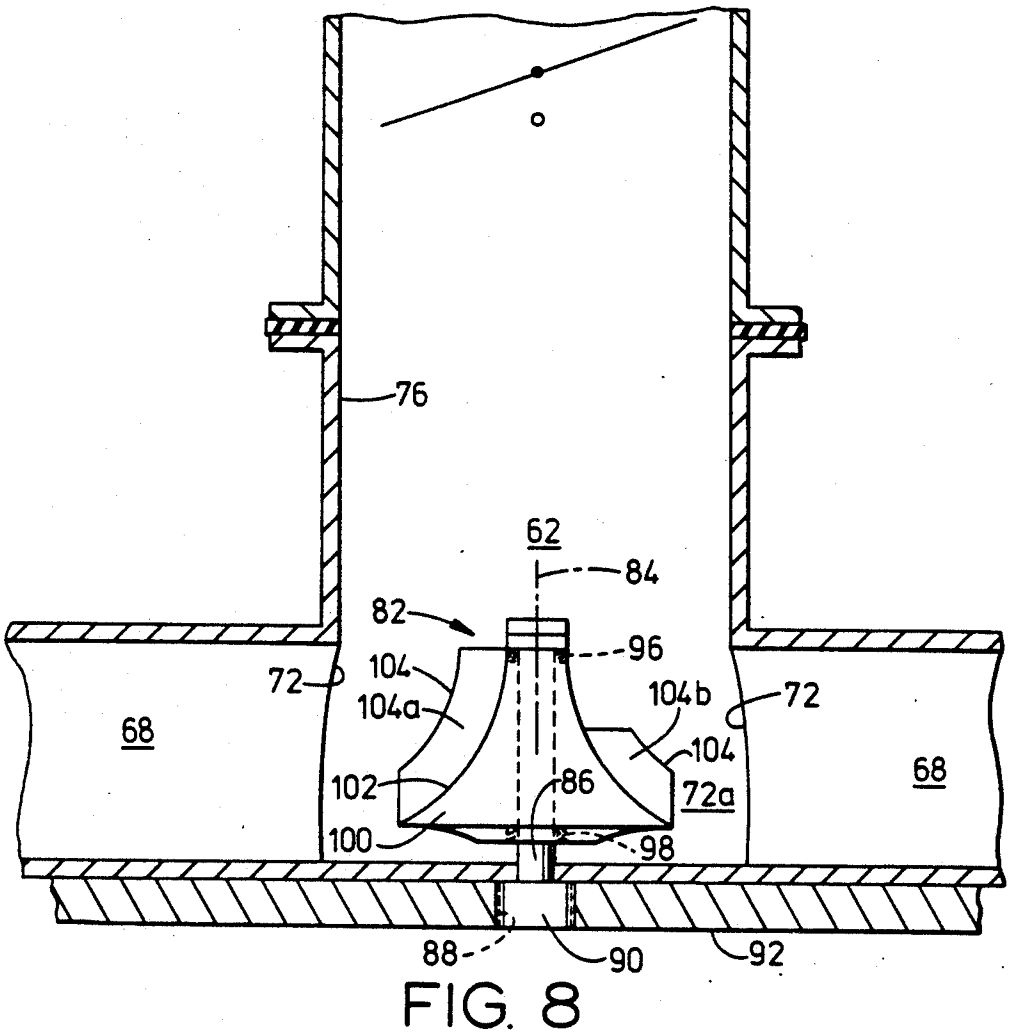
FIG. 8 is a diagrammatic side cross-sectional view taken along line 8—8 of FIG. 7.

Referring to FIGS. 6, 7 and 8, disposed in close proximity to bottom surface 80 of central plenum 62 is rotatable element 82. Rotatable element 82 is disposed to rotate about its axis of rotation 84 which is oriented generally parallel to the downward air-fuel flow through inlet 64 and central plenum 62. The air-fuel mixture flow into port runner openings 72 and associated port runners 68 is generally perpendicular to axis of rotation 84. As depicted in FIG. 8, port runner openings 72 may be considered as having normal axes **72*a* through their centers, which are generally aligned with the center of port runner openings 68, and perpendicular to axis of rotation 84. As will be readily appreciated, the axes 72*a* do not necessarily have to be perpendicular to or intersect axis 84**.

Rotatable element 82 is bearingly supported on shaft 86 which extends upwardly from bottom surface 80 Shaft 86 is non-rotatably secured to bottom surface 80 in any conventional means, and, as depicted, is disposed in threaded bore 88. Shaft 86 includes threaded head 90 which is inserted from underside 92 of bottom wall 94 of manifold 60. Shaft 86 extends into central plenum 62 in a vertical direction. Bearings 96 and 98 are disposed about shaft 86, rotatably supporting rotatable element 82. Bearings 96 and 98 are sealed to prevent the air-fuel flow from dissolving the lubricant in each bearing, which would result in the premature failure of the bearings. Rotational speeds of rotatable element 82 as high as approximately 100,000 RPM have been observed and it is believed that the speed is even higher. Bearings 96 and 98 are sized accordingly to accommodate these speeds.

Rotatable element 82 includes base 100 which carries bearings 96, 98. Base 100 includes a curved, frustoconical surface 102 from which vanes 104 extend. Surface 102 may be curved as shown, or straight. Base 100 may have the frustoconical shape shown, or may be strictly conical by extending above bearing 96, including the peak of the conical shape.

A plurality of vanes 104 extend outwardly from surface 102 as shown. Vanes 104 are curved in the radial direction relative to axis of rotation 84, as best seen in FIG. 6. Vanes 104, as illustrated, include two different sizes of vanes, **104*a* and 104*b*. Vanes 104*a* extend from surface 102 along almost the entire length of surface 102 from outer circumference 106 of base 100 to top 108 of base 100, as illustrated in FIG. 8. Vanes 104*b* extend from only a portion of the length of surface 102 from outer circumference 106 to intermediate location 110, as shown in FIG. 8. Vanes 104*b* are alternately disposed between vanes 104*a*. Alternatively, vanes 104** may be uniform in shape and size, or even non-uniform in orientation and location.

The size and shape of vanes 104 are selected so that the air-fuel mixture flowing downwardly through central plenum 62 imparts rotational motion to rotatable element 82. As will be appreciated, the function and purpose of rotatable element 82, as described below, can be achieved even when utilized in air-fuel passageways which do not direct the air-fuel flow parallel to the axis of rotation of rotatable element 82. The significance of the direction of the air-fuel flow is to provide the rotational motion of rotatable element 82, as well as to direct entrained liquid fuel droplets theretowards. Central plenum 62 and rotatable element 82 are sized relative to each other so that the pressure drop in the air-fuel flow past rotatable element 82 is minimal, while maintaining the desired effect on the air-fuel mixture, as described below.

Referring now to FIG. 9, rotatable element 82 is shown disposed in the flow path of the air-fuel mixture flow which has liquid fuel droplets 112 (schematically illustrated) entrained therein. FIG. 9 illustrates streamline paths of the air-gaseous fuel mixture as it travels downwardly through central plenum 62, through port runner opening 72 and through port runner 70. As with the prior art, the vaporized fuel in the air-fuel mixture effectively negotiates the change of direction represented in FIG. 9, remaining in the flow through port runner 70. However, as described above with respect to the prior art, the entrained liquid fuel droplets 112 have a tendency to fall out of suspension, crossing the streamlines as the flow changes direction in going from central plenum 62 to port runner 70. Liquid fuel droplets 112 entrained in the air-fuel flow reach rotatable element 82 where they are either impacted from the side by vanes 104, as depicted at 114, or impact surface 102 at 116. At point of impact 114 on vane 104, droplet 112 is at least partially vaporized, producing fuel vapor which flows along the streamlines of the air-fuel mixture flow, and producing smaller droplets **112*a* of varying sizes which are dispersed radially outward with respect to axis of rotation 84 due to the rotation of rotatable element 82 and the centrifugal effects thereof. The "splattering" of droplet 112 due to the impact by vane 104 results in the finer atomization of any fuel which remains as liquid, and vaporizes some of the liquid of droplet 112**.

Droplets which impact surface 102 at point of impact 116 rather than being impacted by vane 104, produce some atomization due to the "splattering" resulting from the impact. However, it is believed that droplet 118 at point of impact 116 initially adheres to surface 102 due to surface tension. The centrifugal force on droplet 118 due to rotation of rotatable element 82 causes droplet 118 to be immediately thrown radially outward from surface 102, or to flow along surface 102 to outer circumference 106 and be thrown radially outward therefrom. In either case, droplet 118 is thrown radially outward from surface 102 with respect to axis of rotation 84, thereby being directed toward port runner 70. It is believed that as droplet 118 is thrown off of surface 102, increased atomization occurs due to a distortion of the generally spherical shape of droplet 118, producing enhanced atomization, as well as vaporization of some of the fuel.

Thus, rotatable element 82 prevents at least some entrained liquid fuel droplets from falling out or remaining out of suspension as the air-fuel mixture flow changes direction from central plenum 62 to port runner 70. The impacts between rotatable element 82 and entrained liquid fuel droplets results in more vaporized fuel and better atomization of the liquid fuel. The key to the effective operation of rotatable element 82 appears to be the uniform distribution of and the redirection and enhanced vaporization and atomization of the liquid fuel droplets radially outward from axis of rotation 84 toward each respective port runner 70. Rotatable element 82 prevents the firing order imbalance from creating a resonance in the direction of flow of entrained liquid fuel droplets so as to prevent specific cylinders from being favored or receiving a richer air-fuel mixture than the other cylinders at any given engine operating condition.

Figure 5A:
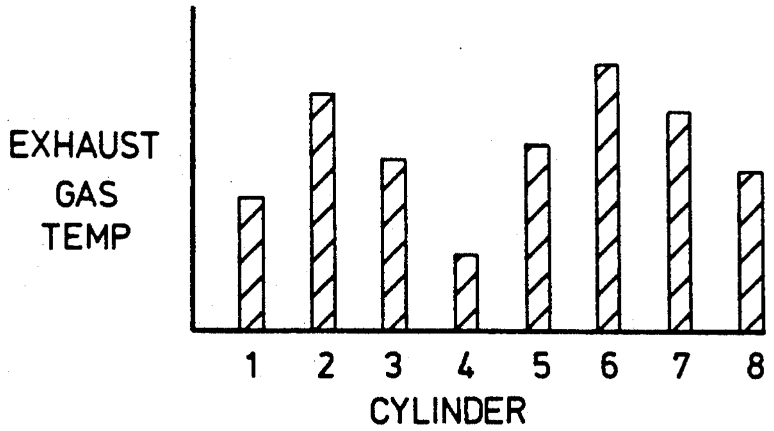
FIG. 5A is a graph illustrating the variation in the exhaust gas temperature from cylinder to cylinder for a given engine operating condition.
Figure 5B:
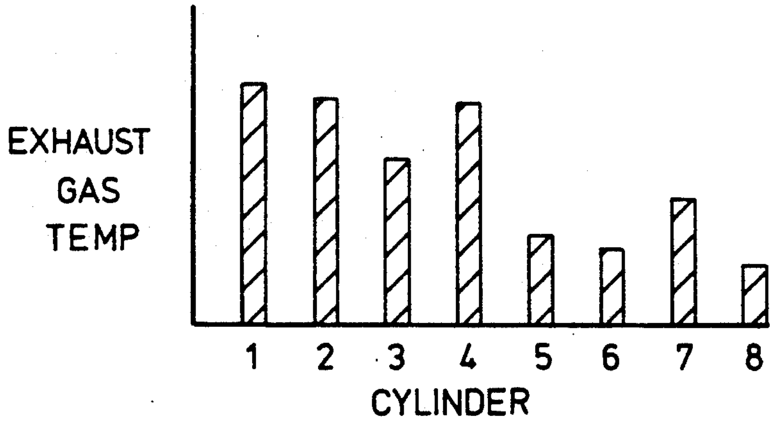
FIG. 5B is a graph illustrating the variation in the exhaust gas temperature from cylinder to cylinder at an engine operating condition different from that of FIG. 5A.
Figure 5C:
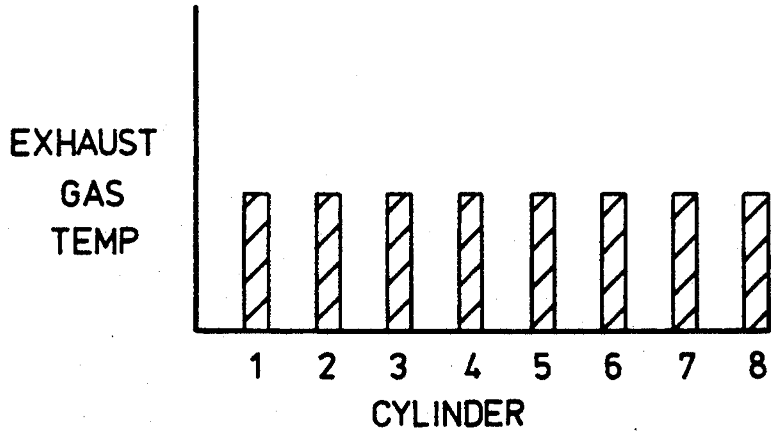
FIG. 5C is a graph illustrating the uniform equalization of the exhaust gas temperature of each cylinder for any engine operating condition by utilizing the present invention.

In tests of the present invention wherein an intake rotor from an automotive turbo charger was installed in a V-8 Chevrolet manifold and mounted to a Chevrolet 355 cubic inch displacement engine, the exhaust gas temperatures of each cylinder were within 25° to 50° F. of each other, as generally depicted in FIG. 5C. This indicated a substantially uniform air-fuel ratio of the air-fuel mixture delivered to each cylinder. This also resulted in the relatively uniform production of power from each cylinder, and increased the total engine brake specific horsepower by approximately 15 hp at 4500 rpm.

As previously mentioned, the shape of vanes 104 of rotatable element 82 are such that the air-fuel flow causes the rotation of rotatable element 82. Rotatable element 82 does not compress the air, but in being rotatably driven powered thereby, results in a slight pressure drop thereacross. The shape and location of rotatable element 82 may be selected to minimize the pressure drop thereacross while maximizing the increased atomization and vaporization. The overall design of manifold 60 and the flow passageway may be sized to produce the desired pressure drop when rotatable element 82 is incorporated.

It is possible for rotatable element 82 to overrun the air-fuel mixture flow therethrough. An overrun of the air-fuel flow occurs when rotatable element 82 rotates faster than the speed at which the particular flow velocity would drive rotatable element 82. Such a condition arises when the engine undergoes a rapid decrease in operating speed, such as by closing the carburetor air inlet valve. The shape of vanes 104 are shaped such that rotatable element 82 does not compress the air-fuel flow through central plenum 62 during an overrun. Although it is contemplated that rotatable element 82 will be driven by the air-fuel flow through central plenum 62, it is within the scope of the present invention that it may also be powered by any means known in the art.

The present invention may be incorporated into the original design and manufacture of a particular manifold or engine, or be retrofitted into existing manifolds or engines on an aftermarket basis. For example, a manifold incorporating rotatable element 82 may be installed on an engine on an aftermarket basis. It may alternately be included in the engine at the time of manufacture. Rotatable element 84 may also be rotatably supported on a framework designed to be inserted as an aftermarket product into the central plenum of a manifold by securing the framework, for example, to the manifold flange between the carburetor and the inlet flange thereof.

Figure 10:
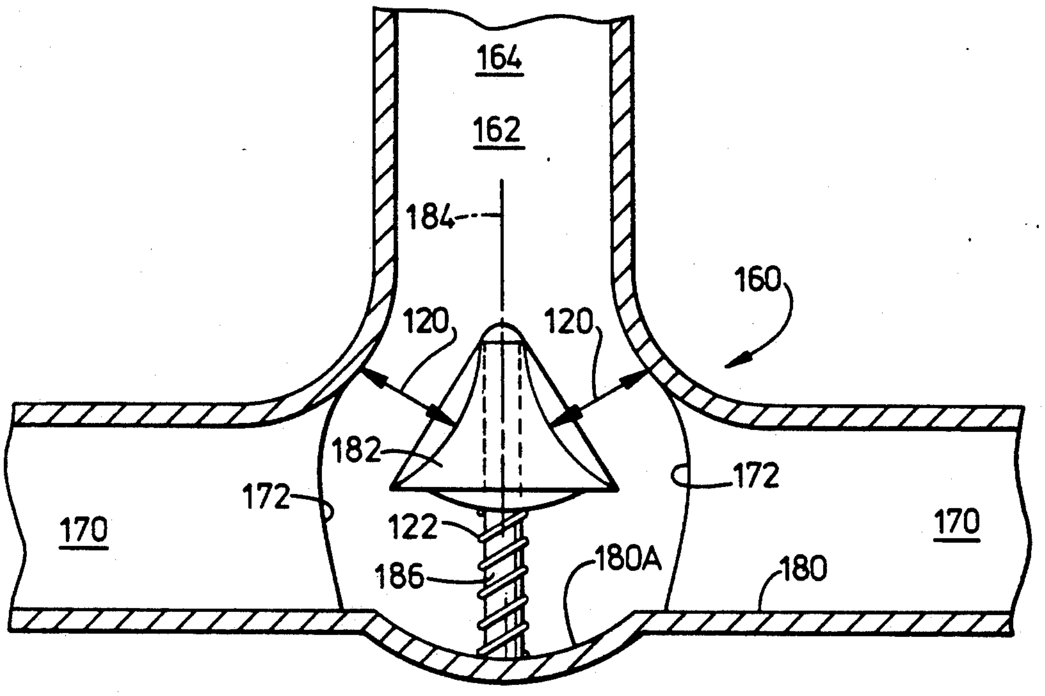
FIG. 10 is a diagrammatic side cross-sectional view of an intake manifold incorporating a variable height rotatable element according to one embodiment of the present invention.
Figure 11:
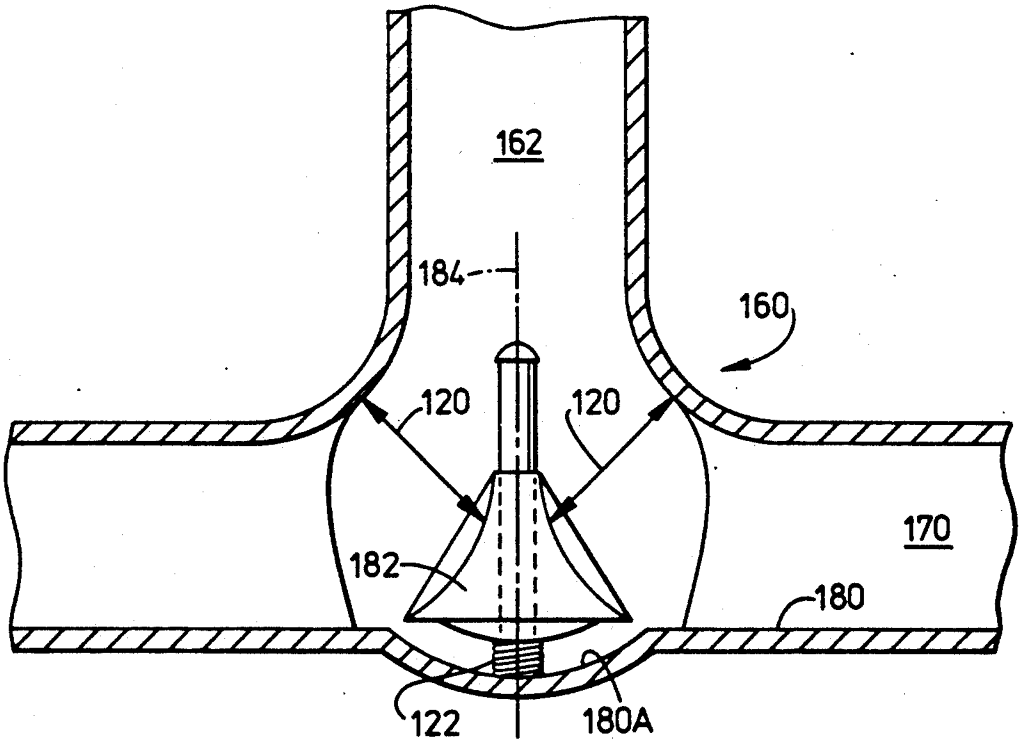
FIG. 11 is a diagrammatic side cross-sectional view showing the rotatable element of FIG. 10 at its lowest position.

Referring now to FIGS. 10 and 11, an alternate embodiment of the present invention is disclosed in which rotatable element 182 is rotatably disposed in central plenum 162, both of which are shaped complementarily to each other to form annular air-fuel flow orifice 120 therebetween. The axial position of rotatable element 182 along rotation of axis 184 is variable by slidably and rotatably mounting rotatable element 182 to shaft 186. When the engine (not shown) is operating at a high speed, producing a high flow and velocity of the air-fuel mixture through central plenum 162, rotatable element is urged downwardly toward bottom surface 180, against spring 122, thereby maximizing the cross-sectional area of annular air-fuel orifice 120. Rotatable element 182 operates as described above to enhance the atomization and vaporization of the entrained liquid fuel droplets to create a uniform and equal air-fuel ratio distribution in each cylinder of the engine. Recess **180*a* may be formed in bottom surface 180, shaped complementarily to lower portion 182*a* of rotatable element 182, to accommodate the height of spring 122 in the compressed state as shown in FIG. 11**.

When the engine is operating at a slower speed, producing a lower flow and velocity of the air-fuel mixture through central plenum 162, spring 122 moves rotatable element 182 upwardly along shaft 186 and axis of rotation 184. Rotatable element 182 assumes a position along axis of rotation 184 at which the downward force of the air-fuel flow is approximately equal to the upward force exerted by spring 122. Spring 122 is sized so as to position rotatable element 182 in a given axial location for a given engine speed and corresponding air-fuel flow rate, preferably producing a minimal, substantially constant pressure drop across rotatable element 182 at any engine speed. Spring 122 may be a variable force spring, or alternatively, a mechanical or hydraulic actuator, controlled by any conventional means.

Variable cross-sectional area annular air-fuel orifice 120 produces a drop in pressure as the air-fuel mixture flows therethrough. Port runners 170 and associated port runner openings 172 may be sized so that the overall pressure drop from inlet 164 to the respective port runner outlets (not shown) is substantially the same as that of a typical prior art intake manifold 20, thereby allowing intake manifold 160 which incorporates this embodiment of the present invention to be used interchangeably with the prior art manifolds, for example, as an aftermarket product.

Figure 12:
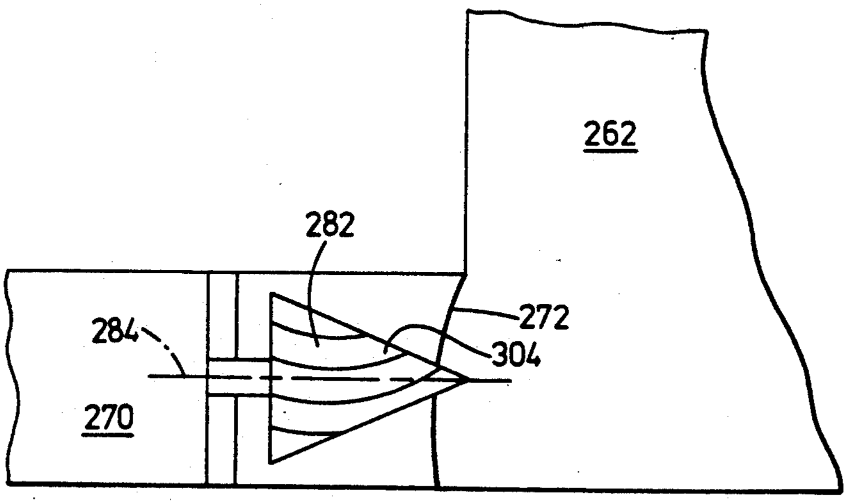
FIG. 12 is a diagrammatic cross-sectional side view of a rotatable element according to one embodiment of the present invention disposed in a port runner of the intake manifold.

Referring to FIG. 12, a third embodiment of the present invention is shown, in which rotatable element 282 is disposed in port runner 270, downstream of central plenum 262 and port runner opening 272. The axis of rotation 284 of rotatable element 282 is generally parallel to the direction of flow of the air-fuel mixture through port runner 270. Rotatable element 282 (and associated vanes 304) operates to enhance the atomization and vaporization of the entrained liquid fuel droplets which flow through port runner 270. Although this embodiment may not be as effective at increasing the overall performance of the engine, nor capable of equalizing the air-fuel ratio of each cylinder, as is rotatable element 82, rotatable element 282 can increase the amount of vaporized fuel in the air-fuel mixture, as well as enhance the atomization of the entrained liquid fuel droplets by decreasing the droplet size in port runner 270, thereby improving the combustion of the air-fuel mixture that reaches the respective cylinder associated with port runner 270. Rotatable element 282 may be movable along its axis of rotation 284 and the interior of port runner 270 may be shaped complementarily to rotatable element 282 so as to produce a variable cross-sectional, substantially constant pressure drop (independent of engine speed) annular air-fuel orifice, similar to the embodiment depicted in FIGS. 10 and 11.

FIGS. 13A and 13B disclose a top view and side view, respectively, of an alternate embodiment of rotatable element 382. Base 400 is a circular disk having a plurality of vanes 404 extending upwardly from surface 402 of base 400. Vanes 404 are curved in the radial direction relative to axis of rotation 384, so that an air-fuel flow passing rotatable element 382 in a direction parallel to axis 384 produces rotation of rotatable element 382. When disposed in central plenum 62, as described above, vanes 404 impact liquid fuel droplets 112, enhancing the vaporization and atomization thereof in the manner as described above. The arcuate shape of vanes 404 produce the rotation of rotation element 382 in response to air-fuel flow thereabouts.

As will be readily appreciated by a person of ordinary skill in the art, although the invention has been described and illustrated in combination with a naturally aspirated, carburetor engine, it is capable of being used with engines having different fuel delivery systems.

In summary, numerous benefits have been described which result from employing the concepts of the invention. The rotatable element disposed in the air-fuel flow enhances the vaporization and atomization of the entrained liquid fuel droplets in the flow. Disposing the rotatable element in the central plenum of an open plenum manifold, as described above, results in the relatively equal distribution of the air-fuel ratio to the cylinders, thereby increasing the total power output of the engine.

The foregoing description of preferred embodiments of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. An intake manifold for use with an internal combustion engine which utilizes a flow of an air-fuel mixture, said manifold comprising:

(a) an air-fuel passageway formed by said manifold, said passageway having at least one inlet and at least one outlet, said passageway adapted to receive said air-fuel flow through said passageway and out at least one of said outlets; and (b) a rotatable element rotatably disposed at least partially in said passageway, said rotatable element being rotatable about its axis of rotation, said rotatable element including (i) a base having a top, a bottom, and a generally frustoconical surface therebetween;

(ii) a plurality of first vanes extending outwardly from said surface from a first location adjacent said top of said base to a second location adjacent said bottom of said base; and (iii) said plurality of first vanes being adapted to cause said rotatable element to rotate about said axis of rotation in response to said air-fuel flow through said passageway.

2. The device of claim 1 wherein said plurality of first vanes are adapted to cause said rotatable element to rotate at a speed of at least about 100,000 RPM in response to said air-flow through said passageway.

3. The device according to claim 1 wherein said passageway includes a central plenum disposed in fluid communication with at least one of said at least one inlet and with each of said outlets, said rotatable element being disposed at least partially in said central plenum.

4. The device according to claim 1 wherein each respective vane of said plurality of vanes is radially curved with respect to said axis of rotation.

5. The device according to claim 1 wherein said surface of said base is curved.

6. The device of claim 1 wherein said top of said base comprises a conical peak.

7. The device of claim 1 comprising a plurality of second vanes extending outwardly from said surface from a first location intermediate said top and said bottom of said base to a second location adjacent said bottom of said base.

8. The device of claim 1 comprising a shaft disposed at least partially in said central plenum, and at least one lubricated bearing disposed about said shaft and rotatably supporting said rotatable element, said at least one bearing being sealed so as to prevent said air-fuel mixture from dissolving lubricant in said at least one bearing.

9. The device of claim 1 wherein said rotatable element is moveable along its axis of rotation, said rotatable element being resiliently biased toward said at least one inlet.

10. An intake manifold for use with an internal combustion engine which utilizes a flow of an air-fuel mixture, said manifold comprising:

(a) an air-fuel passageway formed by said manifold, said passageway having at least one inlet and at least one outlet, said passageway adapted to receive said air-fuel flow through at least one of said inlets and to direct said air-fuel flow through said passageway and out at least one of said outlets; and (b) a rotatable element rotatably disposed at least partially in said passageway, said rotatable element being rotatable about its axis of rotation, said rotatable element including means for causing said rotatable element to rotate at a speed of at least about 100,000 RPM in response to said air-flow through said passageway.

11. The device of claim 10 wherein said rotatable element includes a base having a top, a bottom, and a generally frustoconical surface therebetween, and wherein said means comprises:

(a) a plurality of first vanes extending outwardly from said surface from a first location adjacent said top of said base to a second location adjacent said bottom of said base; and (b) at least one lubricated bearing rotatably supporting said rotatable element, said at least one bearing being sealed so as to prevent said air-fuel mixture from dissolving lubricant in said at least one bearing.

12. The device according to claim 10 wherein said passageway includes a central plenum disposed in fluid communication with at least one of said at least one inlet and with each of said outlets, said rotatable element being disposed at least partially in said central plenum.

13. The device of claim 11 wherein said vanes are radially curved with respect to said axis of rotation.

14. The device of claim 11 wherein said surface is curved.

15. The device of claim 11 wherein said top comprises a conical peak.

16. The device of claim 11 wherein said means comprises a plurality of second vanes extending outwardly from said surface from a first location intermediate said top and said bottom of said base to a second location adjacent said bottom of said base.

17. The device of claim 16 wherein each respective vane of said plurality of second vanes is disposed alternately in between respective adjacent pairs of said plurality of first vanes.

18. An internal combustion engine which utilizes a flow of an air-fuel mixture, comprising:

(a) an intake manifold having an inlet and a central plenum in fluid communication with air inlet, said inlet being disposed immediately adjacent said central plenum, said central plenum having a central axis, said central plenum including an inner peripheral surface and a bottom, said central plenum including a plurality of port runner openings disposed in said inner peripheral surface, said intake manifold including a plurality of port runners in fluid communication with said central plenum through a respective port runner opening;

(b) means for mixing air and fuel together to produce an air-fuel mixture, said means being in fluid communication with said inlet and disposed so as to deliver flow of said air-fuel mixture through said inlet and directly into said central plenum; and (c) a rotatable element rotatably disposed in said central plenum above said bottom in the flow path of said air-fuel mixture, said rotatable element including (i) a base having a top, a bottom, and a generally frustoconical surface therebetween;

(ii) a plurality of first vanes extending outwardly from said surface from a first location adjacent said top of said base to a second location adjacent said bottom of said base; and (iii) said plurality of first vanes being adapted to cause said rotatable element to rotate about said axis of rotation in response to said air-fuel flow through said passageway.

* * * * *

UNITED STATES PATENT AND TRADEMARK OFFICE

CERTIFICATE OF CORRECTION

PATENT NO. : 5,137,005

DATED : August 11, 1992

INVENTOR(S) : Ronald A. Kirby

It is certified that error appears in the above-indentified patent and that said Letters Patent is hereby corrected as shown below:

Column 13, (claim 1) line 67, after "through", please insert --at least one of said inlets and to direct said air-fuel flow through--.

Column 16, (claim 18) line 2, change "air" to --aid--.

Signed and Sealed this

Twenty-eighth Day of September, 1993

Attest:

BRUCE LEHMAN

*Attesting Officer* *Commissioner of Patents and Trademarks*